(12) United States Patent
Takano

(10) Patent No.: US 8,359,036 B2
(45) Date of Patent: Jan. 22, 2013

(54) WIRELESS TERMINAL, BASE STATION AND WIRELESS COMMUNICATION SYSTEM

(75) Inventor: Toshiya Takano, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 13/082,815

(22) Filed: Apr. 8, 2011

(65) Prior Publication Data

US 2011/0250896 A1 Oct. 13, 2011

(30) Foreign Application Priority Data

Apr. 9, 2010 (JP) ................................. 2010-090886

(51) Int. Cl.
*H04W 36/00* (2009.01)

(52) U.S. Cl. ..................... 455/440; 455/434; 455/426.1; 455/454; 370/338

(58) Field of Classification Search .................. 455/440, 455/434, 426.1, 454, 552.1, 561; 370/338
See application file for complete search history.

(56) References Cited

U.S. PATENT DOCUMENTS

| | | | | |
|---|---|---|---|---|
| 7,768,983 | B2 * | 8/2010 | Nylander et al. | 370/338 |
| 8,160,589 | B2 * | 4/2012 | Kuwahara | 455/440 |
| 2007/0097939 | A1 * | 5/2007 | Nylander et al. | 370/338 |
| 2009/0097452 | A1 * | 4/2009 | Gogic | 370/331 |
| 2009/0247157 | A1 * | 10/2009 | Yoon et al. | 455/434 |
| 2009/0253461 | A1 * | 10/2009 | Kuwahara | 455/561 |
| 2010/0056184 | A1 * | 3/2010 | Vakil et al. | 455/456.5 |
| 2010/0304741 | A1 * | 12/2010 | Gogic et al. | 455/434 |

FOREIGN PATENT DOCUMENTS

JP 2009-253569 A 10/2009

OTHER PUBLICATIONS

Office Action in Japanese Patent Application No. 2010-090886 dated Aug. 30, 2011.
Mitsubishi Electric, "Dynamic Setup of HNBs for Energy Savings and Interference Reduction", 3GPP TSG RAN WG3 Meeting #59bis R3-808658, Apr. 3, 2008.

* cited by examiner

*Primary Examiner* — Charles Shedrick
(74) *Attorney, Agent, or Firm* — Knobbe, Martens, Olson & Bear, LLP

(57) ABSTRACT

According to one embodiment, a wireless terminal includes a determination module, a request generator and a transmitter. The determination module is configured to determine whether wireless communication with a second base station is possible, when the wireless terminal is connected to a first base station. The second base station is capable of communicate with the first base station via an inter-base-station network and supports a first operating mode in which wireless communication is valid and a second operating mode in which wireless communication is invalid. The request generator is configured to generate a control signal which comprises address data designating the second base station and which requests for setting the second base station to the first operating mode, if the wireless communication with the second base station is possible. The transmitter is configured to transmit the control signal to the first base station.

8 Claims, 6 Drawing Sheets

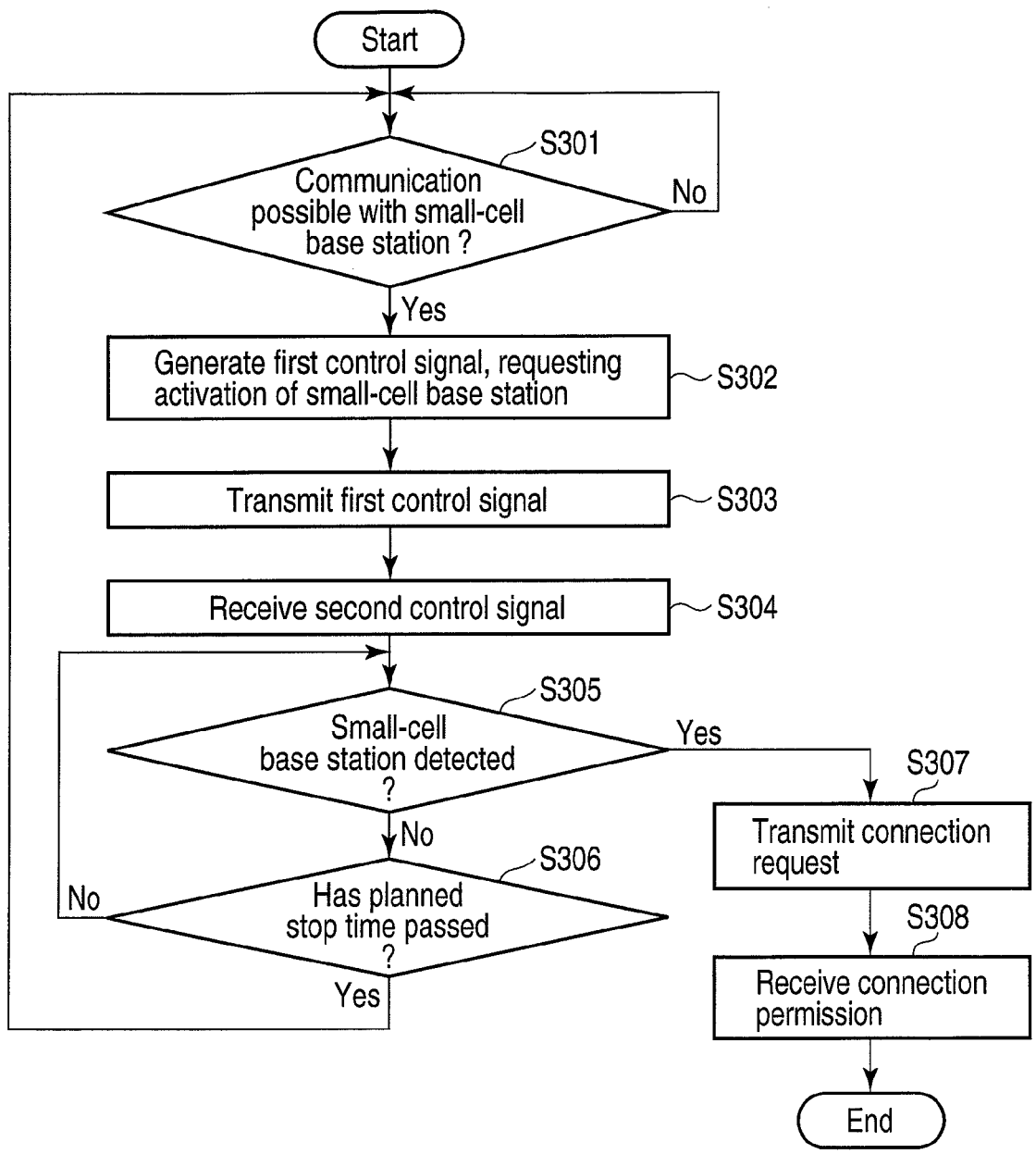
F I G. 6

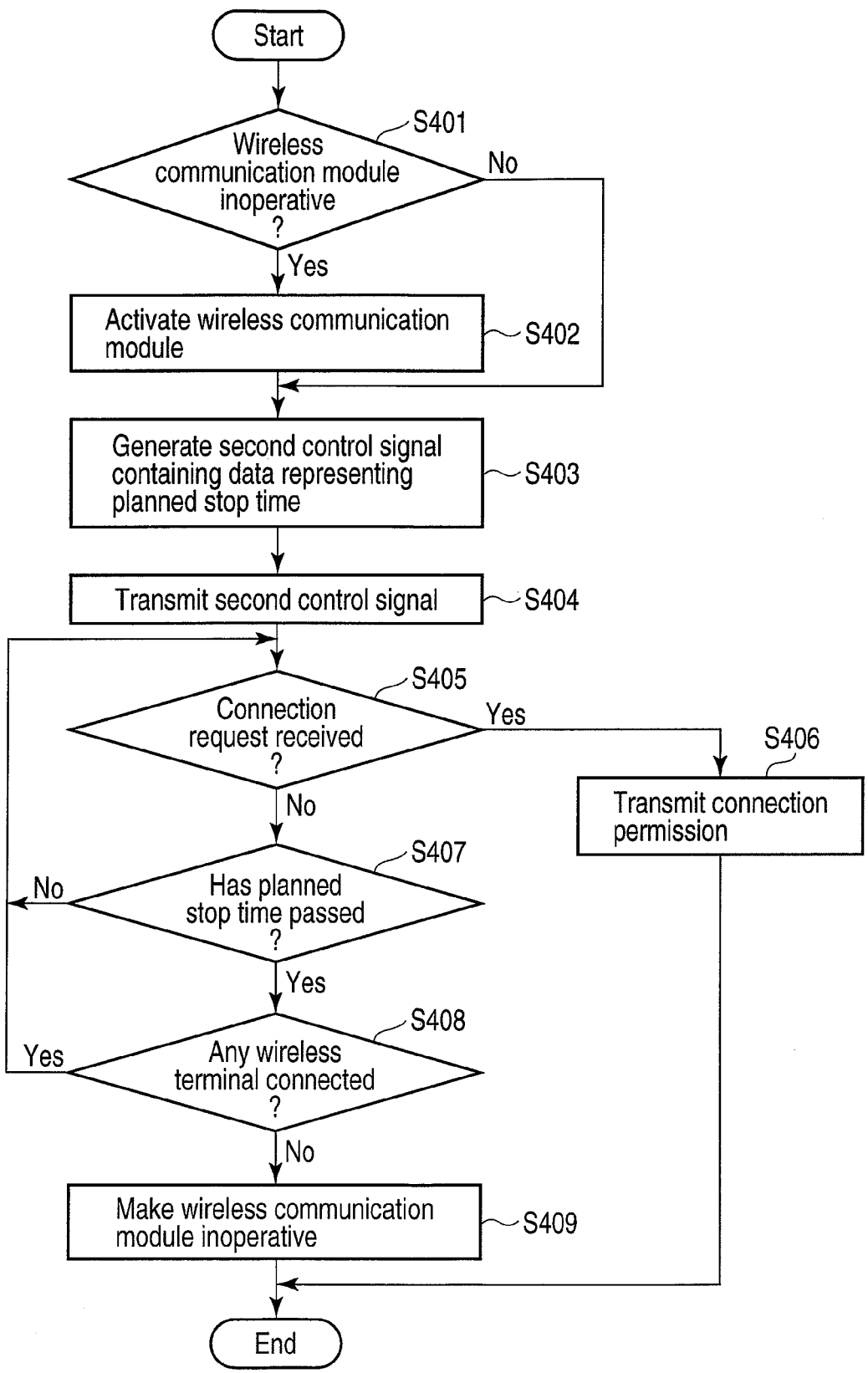
F I G. 7

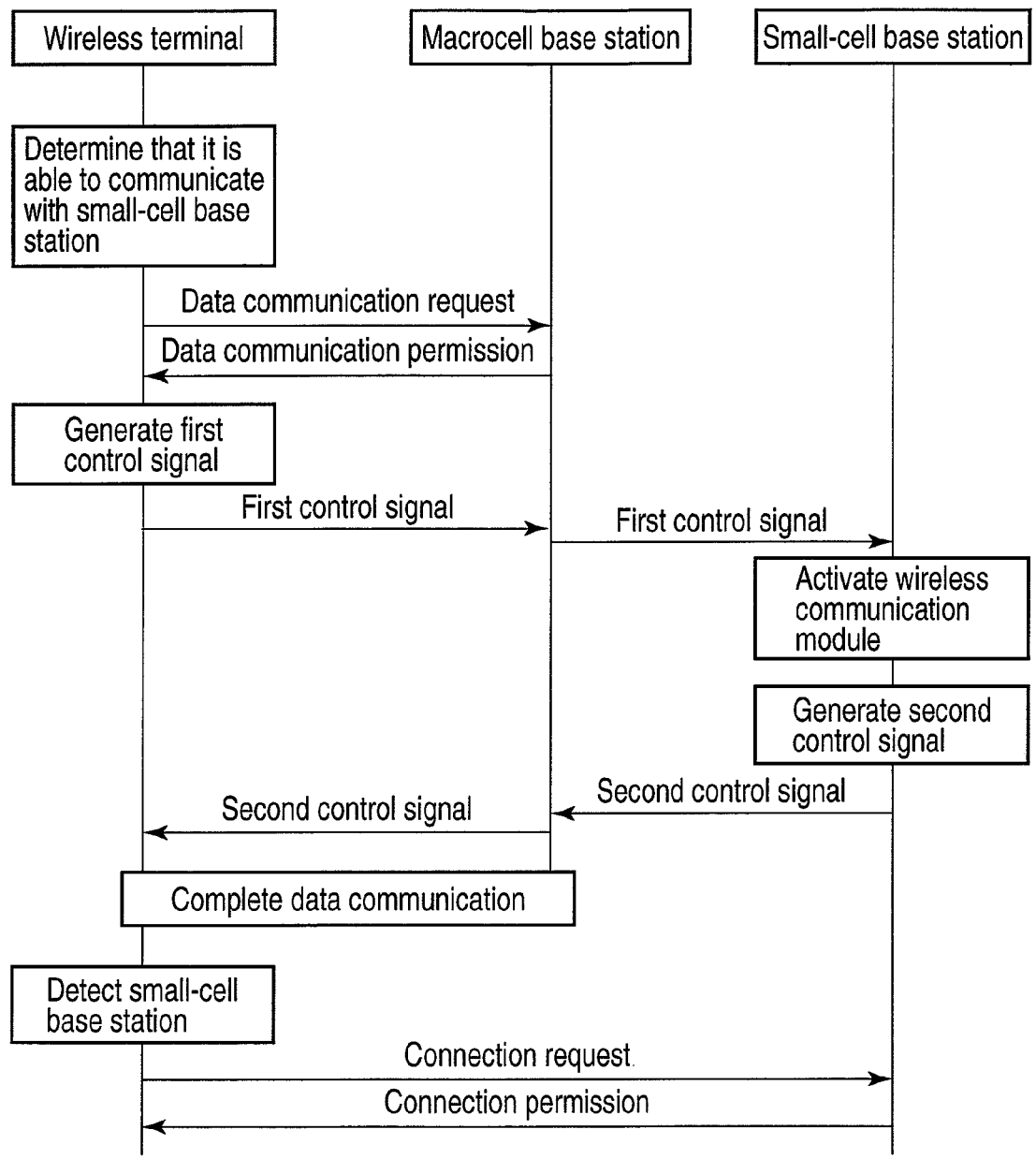
F I G. 8

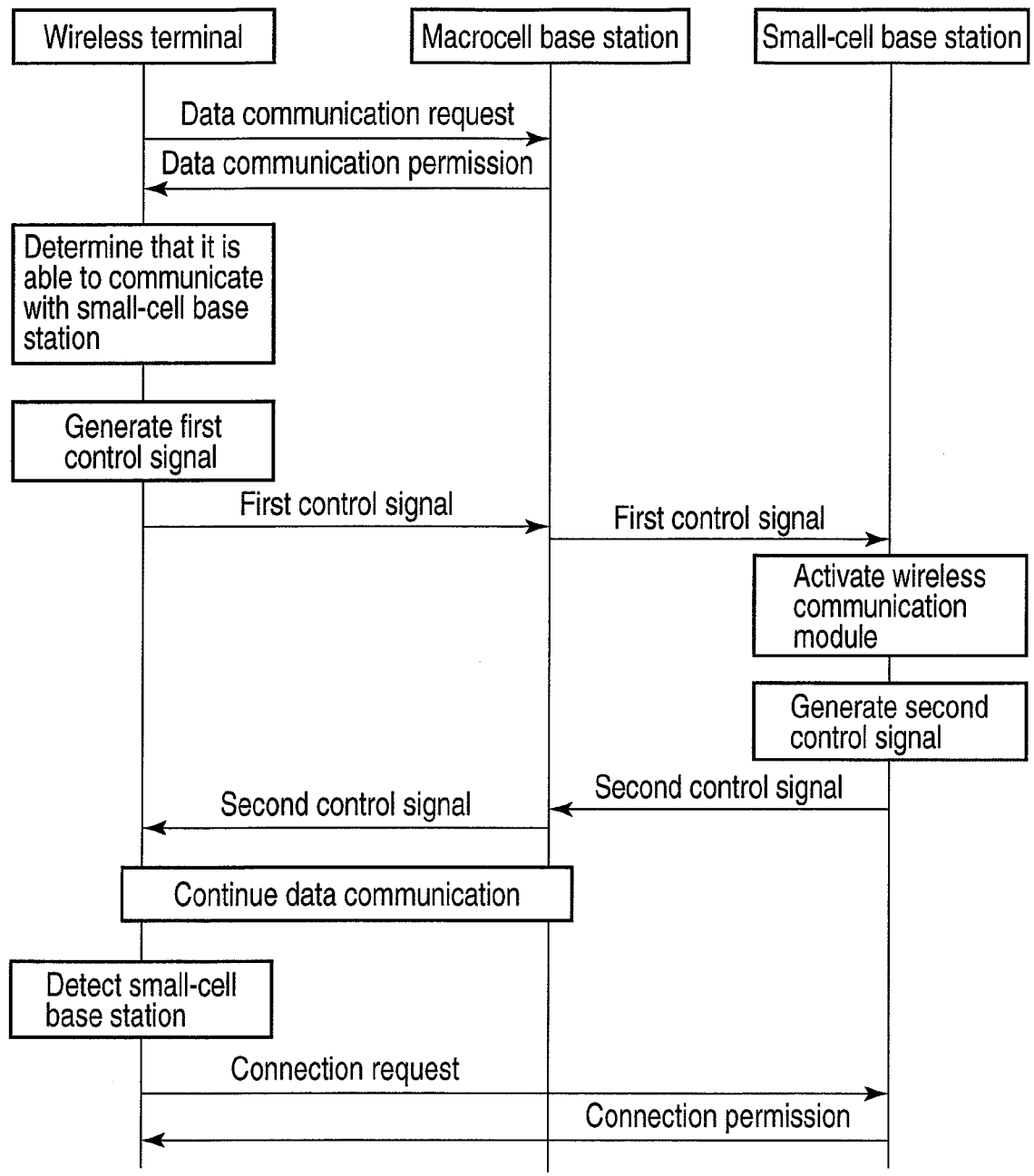
F I G. 9

WIRELESS TERMINAL, BASE STATION AND WIRELESS COMMUNICATION SYSTEM

CROSS-REFERENCE TO RELATED APPLICATIONS

This application is based upon and claims the benefit of priority from Japanese Patent Application No. 2010-090886, filed Apr. 9, 2010; the entire contents of which are incorporated herein by reference.

FIELD

Embodiments described herein relate generally to wireless communication.

BACKGROUND

A great number of base stations have been installed as infrastructure for wireless communication (for example, cellular communication). These base stations provide relatively broad communication areas, representative examples of which are known as macrocells. In each macrocell, the communication quality may locally degrade, for example, at the boundary with any adjacent macrocell, in houses, and in basements, inevitably because of the nature of electric waves. To assist the base station installed in any environment where the communication quality may degrade, small-cell base stations may be installed, each providing a relatively small communication area called a nanocell or picocell. Further, a small-cell base station is proposed, which provides a still smaller communication area called a femtocell.

In most cases, small-cell base stations are arranged in the macrocell provided by a macrocell base station. As a result, interference may occur between the macrocell base station and any small-cell base station. The interference adversely affects the wireless communications. Small-cell base stations providing femtocells are supposed to be accessed by the specific users staving in particular places (e.g., homes and offices). In view of this use condition, the small-cell base stations providing femtocells are supposed to operate in limited time brackets. Hence, it is useful to inhibit a small-cell base station from transmitting wireless signals in anytime bracket the small-cell base station need not operate, in order to reduce power consumption and to prevent interference.

Jpn. Pat. Appln. KOKAI Publication No. 2009-253569 describes a base station apparatus that supports the sleep mode in wireless signals are not transmitted, in addition to the active mode in which wireless signals are transmitted. This base station apparatus determines whether the operating mode should be switched from the sleep mode to the active mode, in accordance with the magnitude of reception power.

The base station apparatus described in Jpn. Pat. Appln. KOKAI Publication No. 2009-253569 determines whether the operating mode should be switched from the sleep mode to the active mode, in accordance with whether the reception power is small or large. Any small-cell base station that provides a femtocell limits users who can access it. Nonetheless, the operating mode of the small-cell base station may change from the sleep mode to the active mode, in accordance with the magnitude of wireless signals transmitted from any user who cannot access the small-cell base station to a macrocell base station. If the small-cell base station undergoes this mode switching, it keeps transmitting unnecessary wireless signals (e.g., pilot signals) until its operating mode is switched back to the sleep mode. The transmission of unnecessary wireless signals is undesirable, because it may result in interference and power consumption.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 6 is a flowchart showing a process performed until a wireless terminal establishes connection to a small-cell base station;

FIG. 7 is a flowchart showing a process performed until a small-cell base station establishes connection to a wireless terminal;

FIG. 8 shows an example sequence of connecting a wireless terminal and a small-cell base station to each other; and FIG. 9 shows another example sequence of connecting a wireless terminal and a small-cell base station to each other.

DETAILED DESCRIPTION

Various embodiments will be described hereinafter with reference to the accompanying drawings.

In general, according to one embodiment, a wireless terminal includes a determination module, a request generator and a transmitter. The determination module is configured to determine whether wireless communication with a second base station is possible, when the wireless terminal is connected to a first base station. The second base station is capable of communicating with the first base station via an inter-base-station network and supports a first operating mode in which wireless communication is valid and a second operating mode in which wireless communication is invalid. The request generator is configured to generate a control signal which comprises address data designating the second base station and which requests setting the second base station to the first operating mode, if wireless communication with the second base station is possible. The transmitter is configured to transmit the control signal to the first base station.

(First Embodiment)

Figure 3:
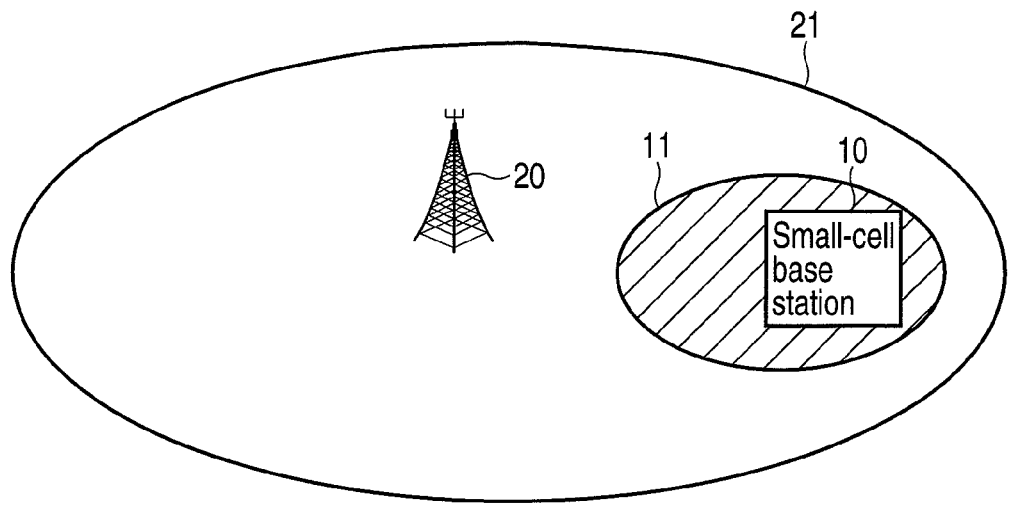
FIG. 3 is a diagram illustrating an example arrangement of base stations in the wireless communication system according to the embodiment.

FIG. 3 illustrates an example arrangement of base stations in the wireless communication system according to an embodiment. In the following description, the term "base station" will be used to mean either a macrocell base station or a small-cell base station in some cases, and to mean both a macrocell base station and a small-cell base station in other cases. The term "macrocell base station" will be used to mean a base station that provides a so-called macrocell. The term "small-cell base station" will be used to means a base station that provides a so-called nanocell, picocell or femtocell.

As shown in FIG. 3, a small-cell base station 10 is installed in a cell 21 of a macrocell base station 20. A wireless terminal that exists in the cell 11 of the small-cell base station 10 can receive communication service from one or both of the small-cell base station 10 and macrocell base station 20. Since the small-cell base station 10 is installed in the cell 21 of the macrocell base station 20, the use efficiency of frequency band, around the cell 11, can be increased. That is, as the number of wireless terminals connected to each of the base stations decreases, the communication capacity of each wireless terminal increases, whereby high-speed, large-capacity communication can be accomplished. Moreover, if the small-cell base station 10 is installed indoors, effective measures will be taken against the dead zone resulting from the attenuation of wireless signals. The following description is based on the assumption that the user places the small-cell base station 10 in the house or office, thereby providing a so-called femtocell (cell 11).

Figure 4:
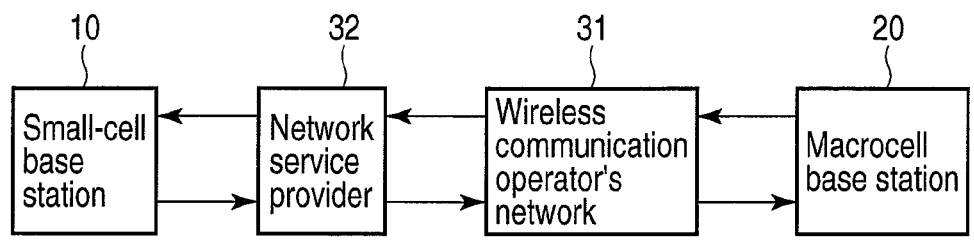
FIG. 4 is a block diagram showing an inter-base-station network connecting a small-cell base station and a macrocell base station.

An inter-base-station network is provided between the small-cell base station 10 and the macrocell base station 20. The inter-base-station network is a wired communication network in most cases. Nevertheless, it may partially include wireless communication network. FIG. 4 shows an example inter-base-station network. As shown in FIG. 4, the macrocell base station 20 establishes connection to other macrocell base stations (not shown) via a wireless communication operator's network 31. The wireless communication operator's network 31 is a communication network provided by the wireless communication operator who manages the macrocell base station 20. In some cases, the macrocell base station 20 may be connected via the wireless communication operator's network 31 to small-cell base stations (not shown) that provide so-called nanocells, picocells, etc. The macrocell base station 20 establishes connection to the small-cell base station 10 via the wireless communication operator's network 31 and network service provider 32. The network service provider 32 is a communication network provided by the network service provider with whom the user of the small-cell base station 10 has entered into a contract. The macrocell base station 20 may merely connect to the small-cell base station 10 via the wireless communication operator's network 31.

Figure 1:
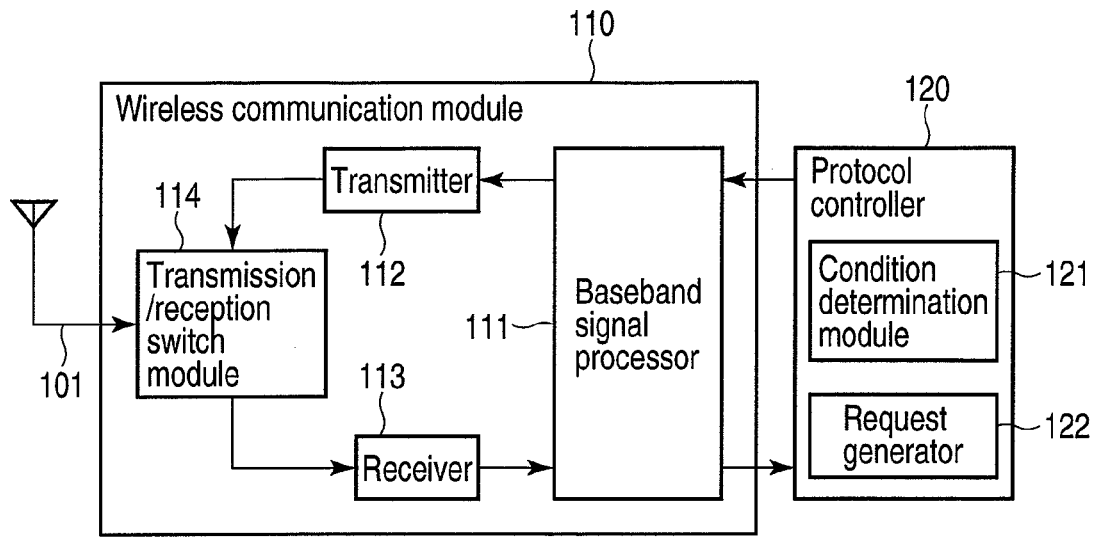
FIG. 1 is a block diagram showing a wireless terminal for use in a wireless communication system according to an embodiment.

As FIG. 1 shows, a wireless terminal used in this embodiment includes an antenna 101, a wireless communication module 110, and a protocol controller 120. The wireless communication module 110 includes a baseband signal processor 111, a transmitter 112, a receiver 113, and a transmission/reception switch module 114. The protocol controller 120 includes a condition determination module 121 and a request generator 122.

The antenna 101 transmits a radio-frequency (RF) band transmission signal input from the baseband signal processor 111 via the transmission/reception switch module 114, or supplies an RF-band reception signal it has received, to the receiver 113 via the transmission/reception switch module 114.

The baseband signal processor 111 performs a baseband signal process based on the wireless-signal format of the wireless communication system that the wireless terminal of FIG. 1 uses. The baseband signal processor 111 adds, for example, error correction codes to transmission data from the protocol controller 120 and performs an interleave process on the data, thus modulating the data, thereby generating a baseband transmission signal. Further, the baseband signal processor 111 demodulates the baseband reception signal supplied from the receiver 113, performs a de-interleave process on the signal and corrects errors in the signal, thereby generating reception data.

The transmitter 112 performs up-conversion and adjustment (digital-to-analog conversion, filtering, power amplification, etc.) on the baseband transmission signal supplied from the baseband signal processor 111, thereby generating the RF-band transmission signal.

The receiver 113 performs down-conversion and adjustment (analog-to-digital conversion, filtering, low-noise amplification, etc.) on the RF-band reception signal, thereby generating the baseband reception signal.

The transmission/reception switch module 114 switches the transmission of a wireless signal to the reception thereof, or vice versa. The transmission/reception switch module 114 is implemented by, for example, a duplexer, or a high-frequency switch.

The protocol controller 120 performs data process in accordance with the communication procedure (protocol) of the wireless communication system that the wireless terminal of FIG. 1 uses. For example, the protocol controller 120 converts communication data and communication control data to be transmitted, thereby generating the transmission data. Further, the protocol controller 120 performs inverse conversion on the reception data supplied from the baseband signal processor 111, in accordance with the protocol, thereby reproducing the communication data and communication control data to be received.

The condition determination module 121 determines whether the wireless terminal of FIG. 1 can communicate with the small-cell base station. The condition determination module 121 can use various decision criterions.

Figure 5:
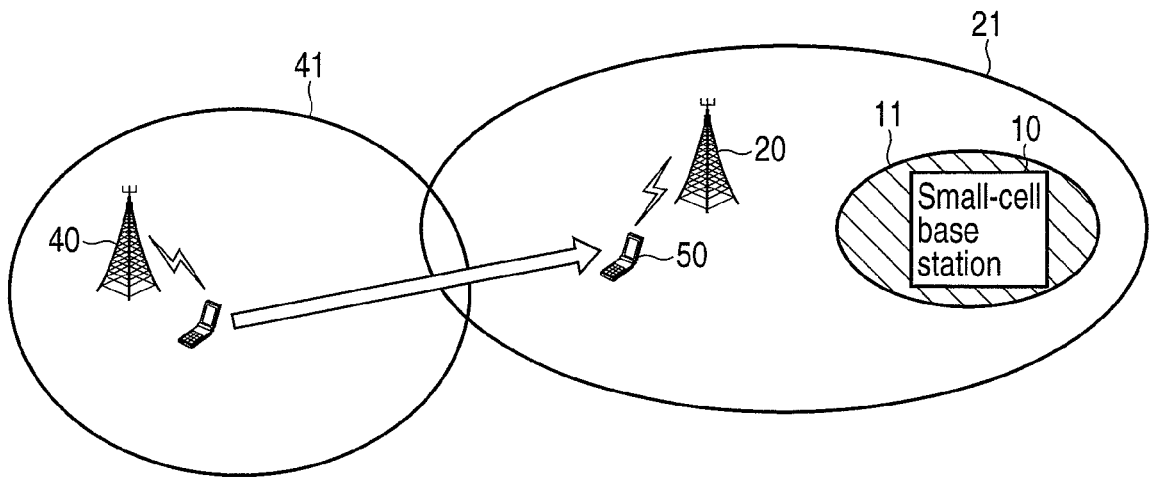
FIG. 5 is a diagram explaining how a wireless terminal achieves communication with a small-cell base station.

The condition determination module 121 may determine whether the wireless terminal can communicate with the small-cell base station, based on, for example, the identification data (BSID) of the base station the wireless terminal of FIG. 1 has re-selected or made a handover with. More specifically, the identification data of the base station having a cell that overlaps with that of the desired small-cell base station is stored beforehand in a storage module (not shown). The condition determination module 121 uses this identification data, making a decision. Assume that as shown in FIG. 5, a wireless terminal 50 connected to a macrocell base station 40 having a cell 41 moves, reselecting the macrocell base station 20 or making a handover with it. Then, the condition determination module 121 incorporated in the wireless terminal 50 determines that the wireless terminal 50 can communicate with the desired small-cell base station 10, because the macrocell base station 20 has a cell 21 that overlaps with the this small-cell base station 10. Such identification data of a base station may be acquired at the time the small-cell base station is installed. Thus if the identification data of the base station that the wireless terminal of FIG. 1 has reselected or made a handover with is identical to the identification data stored in the storage module, the condition determination module 121 determines that the wireless terminal can communicate with the desired small-cell base station.

The condition determination module 121 may make a decision on the basis of the position data of the desired small-cell base station. To be more specific, the position data of the desired small-cell base station is stored beforehand in a storage module (not shown). The condition determination module 121 uses this identification data, making a decision. The condition determination module 121 obtains the position data of the wireless terminal of FIG. 1 through a global positioning system (GPS) receiver (not shown) incorporated in the wireless terminal of FIG. 1. The condition determination module 121 then compares this position data with the position data stored in the storage module, thereby determining whether the wireless terminal can communicate with this small-cell base station. For example, the condition determination module 121 will determine that the wireless terminal can communicate with this small-cell base station, if the distance from the wireless terminal of FIG. 1 to the desired small-cell base station is shorter than a preset distance. The preset distance may be based on the maximum communication distance of the small-cell base station (e.g., cell radius). The use of the position data of the desired small-cell base station may help the condition determination module 121 to determine, at high precision, whether the wireless terminal can communicate with this small-cell base station.

The condition determination module 121 may make a decision from not only the identification data of the base station the wireless terminal of FIG. 1 has reselected or made a handover with, but also the positional data about the desirable small-cell base station. More precisely, the identification data of any base station that has a cell overlapping with that of the desired small-cell base station, and the position data of this small-cell base station, are stored beforehand in the storage module. The condition determination module 121 uses the identification data and the position data, making a decision. First, if the identification data of the base station the wireless terminal of FIG. 1 has reselected or made a handover with is identified with the identification data stored in the storage module, the condition determination module 121 activates a GPS receiver (not shown), which starts receiving the position data of the wireless terminal of FIG. 1. Next, the condition determination module 121 compares the position data of the wireless terminal of FIG. 1 with the position data stored in the storage module, thereby determining whether the wireless terminal can communicate with the small-cell base station. Note that the preset distance may be defined based on the maximum communication distance of the small-cell base station. The GPS receiver is thus activated, after the wireless terminal has reselected, or made a handover with, the base station near the small-cell base station. The condition determination module 121 can therefore make a high-precision decision, while saving power at the GPS receiver.

If the condition determination module 121 determines that the wireless terminal can communicate with the desired small-cell base station, the request generator 122 generates a first control signal requesting for the activation of the small-cell base station. The first control signal contains the identification data of the wireless terminal of FIG. 1 and the data representing a planned start time, at which the wireless terminal should start communicating with the small-cell base station. The identification data of the wireless terminal is, for example, temporary mobile subscriber identity (TMSI). The first control signal further contains address data designating the small-cell base station (e.g., Internet Protocol [IP] address of the small-cell base station). The first control signal conforms to IP or any other protocol that can hold address data.

Figure 2:
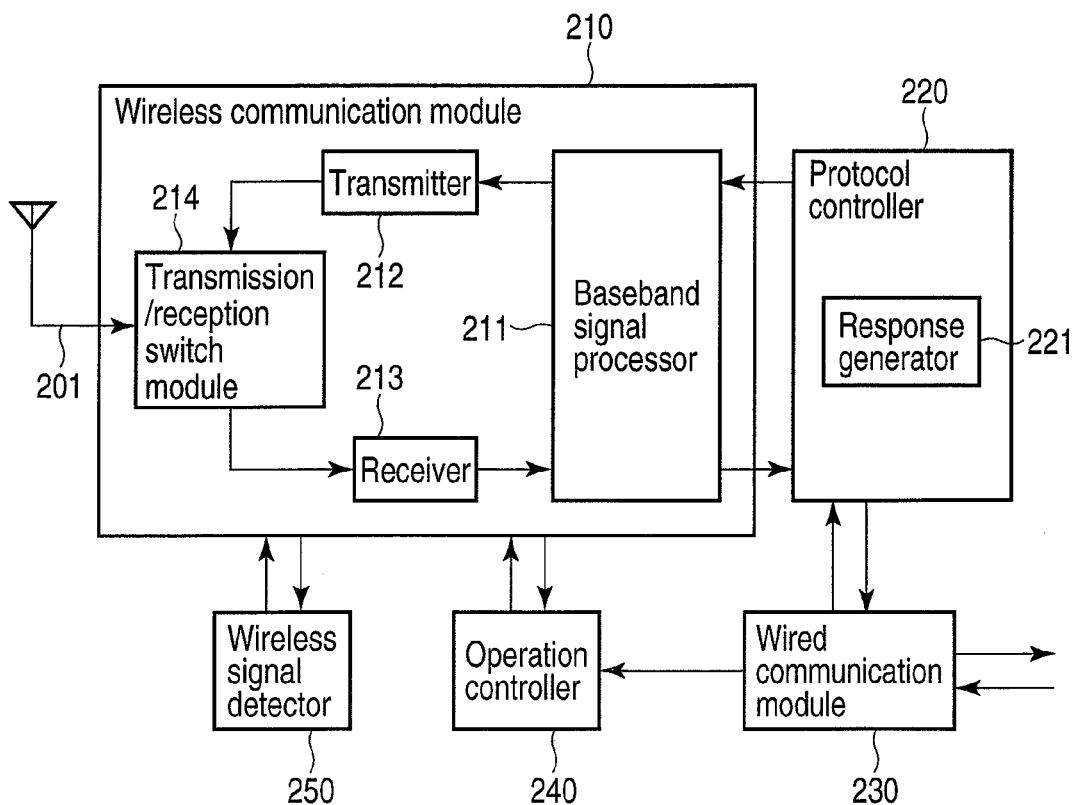
FIG. 2 is a block diagram showing a small-cell base station for use in the wireless communication system according to the embodiment.

As shown in FIG. 2, the small-cell base station according to this embodiment has an antenna 201, a wireless communication module 210, a protocol controller 220, a wired communication module 230, an operation controller 240, and a wireless signal detector 250. The wireless communication module 210 includes a baseband signal processor 211, a transmitter 212, a receiver 213, and a transmission/reception switch module 214. The protocol controller 220 includes a response generator 221.

The antenna 201 transmits an RF-band transmission signal input from the transmitter 212 via the transmission/reception switch module 214, or supplies an RF-band reception signal it has received, to the receiver 213 via the transmission/reception switch module 214.

The wireless communication module 210 performs a wireless communication function of achieving wireless communication between the small-cell base station of FIG. 2 and a wireless terminal. The wireless communication module 210 supports a first operating mode in which wireless communication is valid, and a second operating mode in which wireless communication is invalid. The operating mode of the wireless communication module 210 is controlled by the operation controller 240. In the second operating mode, no power is supplied to the wireless communication module 210, and the wireless communication module 210 remains inoperative.

The baseband signal processor 211 performs a baseband signal process based on the wireless-signal format of the wireless communication system that the small-cell base station of FIG. 2 uses. The baseband signal processor 211 adds, for example, an error correction code to transmission data from the protocol controller 220 and performs an interleave process on the data, thus modulating the data, thereby generating a baseband transmission signal. Further, the baseband signal processor 211 demodulates a baseband reception signal supplied from the receiver 213, performs an interleave process on the signal and corrects errors in the signal, thereby generating reception data.

The transmitter 212 performs up-conversion and adjustment (digital-to-analog conversion, filtering, power amplification, etc.) on the baseband transmission signal supplied from the baseband signal processor 211, thereby generating the RF-band transmission signal.

The receiver 213 performs down-conversion and adjustment (analog-to-digital conversion, filtering, low-noise amplification, etc.) on the RF-band reception signal, thereby generating the baseband reception signal.

The transmission/reception switch module 214 switches the transmission of a wireless signal to the reception thereof, or vice versa. The transmission/reception switch module 214 is implemented by, for example, a duplexer, or a high-frequency switch.

The protocol controller 220 performs data processing in accordance with the protocol of the wireless communication system that the wireless terminal of FIG. 2 utilizes. For example, the protocol controller 220 converts communication data and communication control data to be transmitted, thereby generating transmission data. Further, the protocol controller 220 performs inverse conversion on the reception data supplied from the baseband signal processor 111, in accordance with the protocol, thereby reproducing communication data and communication control data to be received.

The response generator 221 generates a second control signal in response to the first control signal the wired communication module 230 has received. The second control signal contains the identification data of the wireless terminal that has transmitted the first control signal, the data representing a planned start time at which the small-cell base station should start communicating with the wireless terminal, and the data representing a planned stop time at which the wireless communication module 210 should be switched to the second operating mode if the wireless terminal is not connected to the small-cell base station. The second control signal further contains address data designating the wireless terminal (e.g., IP address of the wireless terminal). The second control signal conforms to IP or any other protocol that can hold address data. According to the planned stop time, the small-cell base station can efficiently be set to the second operating mode. Moreover, referring to the planned stop time, the wireless terminal can easily detect timeout for connecting to the small-cell base station.

The wired communication module 230 has a control function and a data communication function. The small-cell base station of FIG. 2 can therefore communicate with any other base station through the inter-base-station network. The wired communication module 230 changes, for example, the format of the communication data or communication control data coming from the small-cell base station, and then supplies the data thus converted to the inter-base-station network. Further, the wired communication module 230 acquires the communication data or communication control data addressed to the small-cell base station, and changes the format of the data. On receiving the first control signal via the inter-base-station network, the wired communication module 230 changes the format of the first control signal and inputs the first control signal to the response generator 221. Further, the wired communication module 230 gives the operation controller 240 the data indicating the receipt of the first control signal. The wired communication module 230 may authenticate the wireless terminal, or may discard the first control signal if the identification data contained in the first control signal is not identical to prescribed identification data. This authentication method can not only restrict the access to the small-cell base station of FIG. 2, but also prevent the wireless communication module 210 from erroneously activating. Moreover, the wired communication module 230 supplies the second control signal it has received from the response generator 221, to the inter-base-station network. The second control signal is supplied to the base station to which the wireless terminal is connected, and transmitted from this base station to the wireless terminal.

The operation controller 240 controls the operating mode of the wireless communication module 210. The operation controller 240 enables the power supply to the wireless communication module 210 in the first operating mode, and disables the power supply to the wireless communication module 210 in the second operating mode. If the planned stop time represented by the data contained in the second control signal previously transmitted has passed and if no wireless terminals are connected to the small-cell base station of FIG. 2, the operation controller 240 changes the operating mode of the wireless communication module 210, from the first mode to the second mode. On receiving the data indicating the receipt of the first control signal, from the wired communication module 230, the operation controller 240 changes the operating mode of the wireless communication module 210, from the second mode to the first mode.

After the operating mode of the wireless communication module 210 is changed from the second mode to the first mode, the wireless signal detector 250 detects surrounding wireless signals. The wireless signal detector 250 analyzes the data (e.g., frequency used, intensity of electric waves, etc.) about the base station existing around the small-cell base station of FIG. 2, from the wireless signals it has detected. Further, the wireless signal detector 250 monitors the communication state between the base station existing around the small-cell base station and the wireless terminal.

The process performed until the wireless terminal of FIG. 1 establishes connection to the small-cell base station will be explained with reference to FIG. 6. The process of FIG. 6 is started when the wireless terminal of FIG. 1 reselects a base station, when the wireless terminal of FIG. 1 makes a handover with the base station, or when the wireless terminal of FIG. 1 acquires position data.

First, in Step S301, the condition determination module 121 determines whether the wireless terminal of FIG. 1 can communicate with the desired small-cell base station. If the condition determination module 121 determines that the wireless terminal can communicate with the desired small-cell base station, the process goes to Step S302. Otherwise, the process returns to Step S301.

In Step S302, the request generator 122 generates the first control signal. Then, the wireless terminal of FIG. 1 transmits the first control signal generated in Step S302, to the base station connecting to it (Step S303). The first control signal is transmitted from the base station via the inter-base-station network to the desired small-cell base station. In response of the first control signal, the small-cell base station generates the second control signal. The second control signal is transmitted via the inter-base-station network to the base station to which the wireless terminal is connected. The antenna 101 and wireless communication module 110 receive the second control signal from the base station connected the wireless terminal (Step S304). The process then goes to Step S305.

In Step S305, the wireless terminal of FIG. 1 tries to detect the small-cell base station. If the wireless terminal successfully detects the small-cell base station, the process goes to Step S307. Otherwise, the process goes to Step 306. In Step S306, the wireless terminal of FIG. 1 determines whether the planned stop time represented by the data contained in the second control signal received in Step S304 has passed or not. If the planned stop time represented by the data contained in the second control signal has passed, the process will return to Step S301 so that the small-cell base station may be activated again. Otherwise, the process returns to Step S306, because the small-cell base station need not be activated again.

In Step S307, the wireless terminal of FIG. 1 transmits a connection request to the small-cell base station. On receiving the connection request, the small-cell base station transmits a connection permission, which the wireless terminal of FIG. 1 receives (Step S308). As a result, the wireless terminal of FIG. 1 establishes connection the small-cell base station. Then, the process is completed.

The process, which is performed until the small-cell base station of FIG. 2 establishes connection to the wireless terminal, will be explained with reference to FIG. 7. This process is started when the wired communication module 230 receives the first control signal through the inter-base-station network.

First, the operation controller 240 determines whether the wireless communication module 210 is in the second operating mode (in an inoperative state) (Step S401). If the wireless communication module 210 is inoperative, the process goes to Step S402. Otherwise, the process goes to Step S403. In Step S402, the operation controller 240 sets the wireless communication module 210 to the first operating mode (or actives the wireless communication module 210). The process then goes to Step S403.

In Step S403, the response generator 221 generates the second control signal that contains the data representing the planned stop time. Next, the wired communication module 230 transmits the second control signal via the inter-base-station network to the base station to which the wireless terminal is connected (Step S404). The process goes to Step S405. The second control signal is transmitted to the wireless terminal from the base station to which the wireless terminal is connected.

In Step S405, the small-cell base station of FIG. 2 waits for a connection request coming from the wireless terminal. If the small-cell base station receives a connection request, the process goes to Step S406. Otherwise, the process goes to Step S407. If the planned stop time represented by the data contained in the second control signal (of step S403) has passed, the process will return to Step S406. Otherwise, the process goes to Step S408. In Step S408, any wireless terminal may be found connected to the small-cell base station of FIG. 2. In this case, the process returns to Step S406. Otherwise, the process goes to Step 409. In Step S409, the operation controller 240 sets the wireless communication module 210 to the second operating mode (that is, stops the wireless communication module 210). The process is thereby completed. In Step 406, the small-cell base station of FIG. 2 transmits a connection permission to the wireless terminal, whereby the small-cell base station of FIG. 2 establishes connection to the wireless terminal. In this case, too, the process is completed.

An example sequence of connecting the wireless terminal and the small-cell base station, both according to this embodiment, will be explained with reference to FIG. 8.

If the wireless terminal reselects a macrocell base station or makes a handover with the macrocell base station, the condition determination module 121 incorporated in the wireless terminal determines that the wireless terminal can communicate with a desirable small-cell base station, for example, based on the identification data of the macrocell base station. The wireless terminal transmits a data communication request to the macrocell base station, in order to activate the small-cell base station through the macrocell base station. The macrocell base station transmits data communication permission in response to the data communication request.

The request generator 122 incorporated in the wireless terminal generates the first control signal. The wireless terminal transmits the first control signal generated to the macrocell base station. The macrocell base station transfers the first control signal via the inter-base-station network to the desired small-cell base station. The operation controller 240 incorporated in the small-cell base station activates the wireless communication module 210 if the wireless communication module 210 remains inoperative. The response generator 221 provided in the small-cell base station generates the second control signal in response to the first control signal. The wired communication module 230 incorporated in the small-cell base station transmits the second control signal via the inter-base-station network to the macrocell base station. The macrocell base station transfers the second control signal to the wireless terminal. On receiving the second control signal, the wireless terminal terminates the data communication with the macrocell base station. Thereafter, the wireless terminal detects a small-cell base station and transmits a connection request. In response to this connection request, the small-cell base station transmits connection permission. The above-mentioned sequence can connect the wireless terminal and the small-cell base station, both according to this embodiment.

Another example sequence of connecting the wireless terminal and the small-cell base station, both according to this embodiment, will be explained with reference to FIG. 9.

The condition determination module 121 incorporated in the wireless terminal determines that the wireless terminal can communicate with a desirable small-cell base station, for example, based on the identification data of the macrocell base station, after the data communication with the macrocell base station has started (thus exchanging data communication request and permission). The request generator 122 incorporated in the wireless terminal generates the first control signal. The wireless terminal transmits the first control signal generated to the macrocell base station. The macrocell base station transfers the first control signal via the inter-base-station network to the small-cell base station. The operation controller 240 incorporated in the small-cell base station activates the wireless communication module 210 if the wireless communication module 210 remains inoperative. The response generator 221 provided in the small-cell base station generates the second control signal in response to the first control signal. The wired communication module 230 incorporated in the small-cell base station transmits the second control signal via the inter-base-station network to the macrocell base station. The macrocell base station transfers the second control signal to the wireless terminal. The wireless terminal keeps performing the data communication with the macrocell base station until a small-cell base station is detected. Thereafter the wireless terminal detects the small-cell base station and transmits a connection request. In response to the connection request, the small-cell base station transmits connection permission. This sequence can connect the wireless terminal and the small-cell base station, both according to this embodiment. The wireless terminal can therefore be handed over from the macrocell base station to the small-cell base station.

As has been described, the wireless terminal according to this embodiment requests that the desired small-cell base station be activated, after it has determined that it can communicate with the small-cell base station, for example, based on the identification data of the base station to which it is connected, or based on the position data of the small-cell base station. Therefore, the wireless terminal according to this embodiment can suppress unnecessary activation of small-cell base station (e.g., activation of the small-cell base station during it cannot establish connection to the wireless terminal).

The first control signal, which is a signal requesting for the activation of the small-cell base station, is supplied from the base station to which the wireless terminal is connected, to the small-cell base station through the inter-base-station network. The small-cell base station according to this embodiment can therefore receive the first control signal, which activates the wireless communication module, even if it stops transmission and reception of wireless signals.

Moreover, the second control signal that is a response to the first control signal contains the data representing the planned stop time. If no wireless terminals are connected after the planned stop time has passed, the small-cell base station stops wireless communication. This helps to avoid interference with the adjacent base stations and reduce the power consumption. Further, the wireless terminal can easily detect timeout for connecting to the small-cell base station, merely by referring the planned stop time.

This embodiment can thus efficiently control the activation of the small-cell base station.

The program for achieving the processes performed in the embodiment described above can be stored in a computer-readable storage medium. The storage medium can take any storage format as long as it can store a program and is readable by a computer, like a magnetic disk, an optical disc (e.g., CD-ROM, CD-R, or DVD), a magneto-optical disk (e.g., MO), or a semiconductor memory. Moreover, the program for achieving the processes may be down-loaded to a computer (client) via, for example, the Internet, from a computer (server) connected to the network.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless terminal comprising:
a determination module configured to determine whether wireless communication with a second base station is possible, when the wireless terminal is connected to a first base station,
wherein the second base station is configured to communicate with the first base station via an inter-base-station network, and
wherein the second base station is configured to support a first operating mode in which wireless communication is valid and a second operating mode in which wireless communication is invalid;
a request generator configured to generate a control signal associated with setting the second base station to the first operating mode in response to determining that wireless communication with the second base station is possible; and
a transmitter configured to transmit the control signal to the first base station.

2. The wireless terminal of claim 1, further comprising a storage module configured to store identification data associated with a base station,
wherein the base station is associated with a first cell that overlaps a second cell associated with the second base station, and
wherein the determination module is further configured to determine whether communication with the second base station is possible based, at least in part, on whether identification data associated with the first base station matches the identification data stored in the storage module.

3. The wireless terminal of claim 1, further comprising:
a storage module configured to store position data of the second base station; and
a retrieving module configured to retrieve position data of the wireless terminal,
wherein the determination module is further configured to determine whether wireless communication with the second base station is possible based, at least in part, on the position data of the wireless terminal and the position data of the second base station.

4. The wireless terminal of claim 3, wherein the storage module is further configured to store identification data associated with a base station providing a first cell overlapping a second cell associated with the second base station, and
wherein the retrieving module is further configured to retrieve the position data of the wireless terminal in response to identification data associated with the first base station matching the identification data stored in the storage module.

5. The wireless terminal of claim 1, wherein the control signal is capable of comprising address data associated with the second base station.

6. A base station comprising:
a wireless communication module configured to support a first operating mode in which wireless communication is valid and a second operating mode in which wireless communication is invalid,
wherein the wireless communication module is further configured to transmit and receive one or more wireless signals in the first operating mode;
a wired communication module configured to receive a first control signal which requests setting the wireless communication module to the first operating mode,
wherein the first control signal is received via an inter-base-station network from a second base station, and
wherein the second base station received the signal from a wireless terminal;
a controller configured to set the wireless communication module to the first operating mode in response to receiving the first control signal; and
a response generator configured to generate a second control signal in response to receiving the first control signal,
wherein the second control signal is capable of comprising data identifying a predetermined time when the wireless communication module is set to the second operating mode, and address data associated with the wireless terminal, and
wherein the wired communication module is configured to transmit the second control signal to the second base station.

7. The base station of claim 6, wherein the controller is further configured to set the wireless communication module to the second operating mode in response to determining that no wireless terminals are connected to the base station at the predetermined time.

8. A wireless communication system comprising:
a wireless terminal; and
a first base station configured to communicate with a second base station through an inter-base-station network, wherein the first base station is further configured to support a first operating mode in which wireless communication is valid and a second operating mode in which wireless communication is invalid,
wherein the wireless terminal comprises:
a determination module configured to determine whether wireless communication with the first base station is possible when the wireless terminal is connected to the second base station;
a request generator configured to generate a first control signal which comprises address data designating the first base station and which requests setting the first base station to the first operating mode if the wireless communication with the first base station is possible; and
a transmitter configured to transmit the first control signal to the second base station, and
wherein the first base station comprises:
a wireless communication module configured to transmit and receive one or more wireless signals in the first operating mode;
a wired communication module configured to receive the first control signal from the wireless terminal through the second base station and the inter-base-station network;
a controller configured to set the first base station to the first operating mode in response to the first control signal;
a response generator configured to generate a second control signal in response to the first control signal, wherein the second control signal is capable of comprising data identifying a predetermined time when the wireless communication module is set to the second operating mode, and address data associated with the wireless terminal, and
the wired communication module further configured to transmit the second control signal to the second base station.

* * * * *